(12) United States Patent
Sarkar

(10) Patent No.: US 8,402,561 B2
(45) Date of Patent: Mar. 19, 2013

(54) MEMS ACTUATOR DEVICE WITH INTEGRATED TEMPERATURE SENSORS

(75) Inventor: Niladri Sarkar, Waterloo (CA)

(73) Assignee: ICSPI Corp., Ontario (CA)

( * ) Notice: Subject to any disclaimer, the term of this patent is extended or adjusted under 35 U.S.C. 154(b) by 320 days.

(21) Appl. No.: 12/579,872

(22) Filed: Oct. 15, 2009

(65) Prior Publication Data

US 2011/0093987 A1     Apr. 21, 2011

(51) Int. Cl.
*G01Q 10/02*     (2010.01)
*G01Q 10/04*     (2010.01)
*H02N 10/00*     (2006.01)

(52) U.S. Cl. .................... 850/2; 850/3; 310/307

(58) Field of Classification Search .............. 850/1–4; 310/307, 306
See application file for complete search history.

(56) References Cited

U.S. PATENT DOCUMENTS

| | | | |
|---|---|---|---|
| 1,658,669 A | | 2/1928 | Cohn et al. |
| 6,679,055 B1* | | 1/2004 | Ellis ................. 60/527 |
| 6,806,991 B1* | | 10/2004 | Sarkar et al. ........... 359/290 |
| 7,007,471 B2* | | 3/2006 | Sinclair ............. 60/527 |
| 7,928,343 B2* | | 4/2011 | King et al. ............. 219/444.1 |
| 8,148,874 B2* | | 4/2012 | Xie et al. ............. 310/307 |
| 2007/0268808 A1* | | 11/2007 | Culver et al. ............. 369/126 |
| 2007/0278896 A1* | | 12/2007 | Sarkar ............. 310/311 |
| 2009/0139340 A1* | | 6/2009 | King et al. ............. 73/766 |

OTHER PUBLICATIONS

Gilgunn et. al., "CMOS-MEMS Lateral Electrothermal Actuators", Journal of Microelectromechanical Systems, 2008, p. 1-12.*
Gilgunn et al., "CMOS-MEMS Lateral Electrothermal Actuators", Journal of Microelectromechanical Systems, 2008, p. 1-12.*
Gilgunn, P.J., et al., "CMOS—MEMS Lateral Electrothermal Actuators", Journal of Microelectromechanical Systems, 2008, pp. 1-12.
Sarkar, N., et al., "Modular MEMS Experimental Platform for Transmission Electron Microscopy".
Sarkar, N., et al., "A CMOS-MEMS Scanning Probe Microscope with Integrated Position Sensors".

* cited by examiner

*Primary Examiner* — Jack Berman
*Assistant Examiner* — David E Smith
(74) *Attorney, Agent, or Firm* — Kaplan Breyer Schwarz & Ottesen, LLP

(57) ABSTRACT

An electro-thermal actuator which includes a unit cell comprising at least one thermal bimorph, the thermal bimorph comprising at least two materials of different thermal expansion coefficient bonded together, the unit cell having a first end and a second end; and at least one temperature sensor located on the at least one thermal bimorph for measuring a temperature of the at least one thermal bimorph and determining a position of the unit cell. The basic structure can be expanded to 1-D, 2-D and 3-D positioners. The bimorphs can also be coupled to an active yoke which is in turn anchored to a plate, in order to reduce the parasitic heat effects on displacement of the tip of the bimorph.

19 Claims, 11 Drawing Sheets

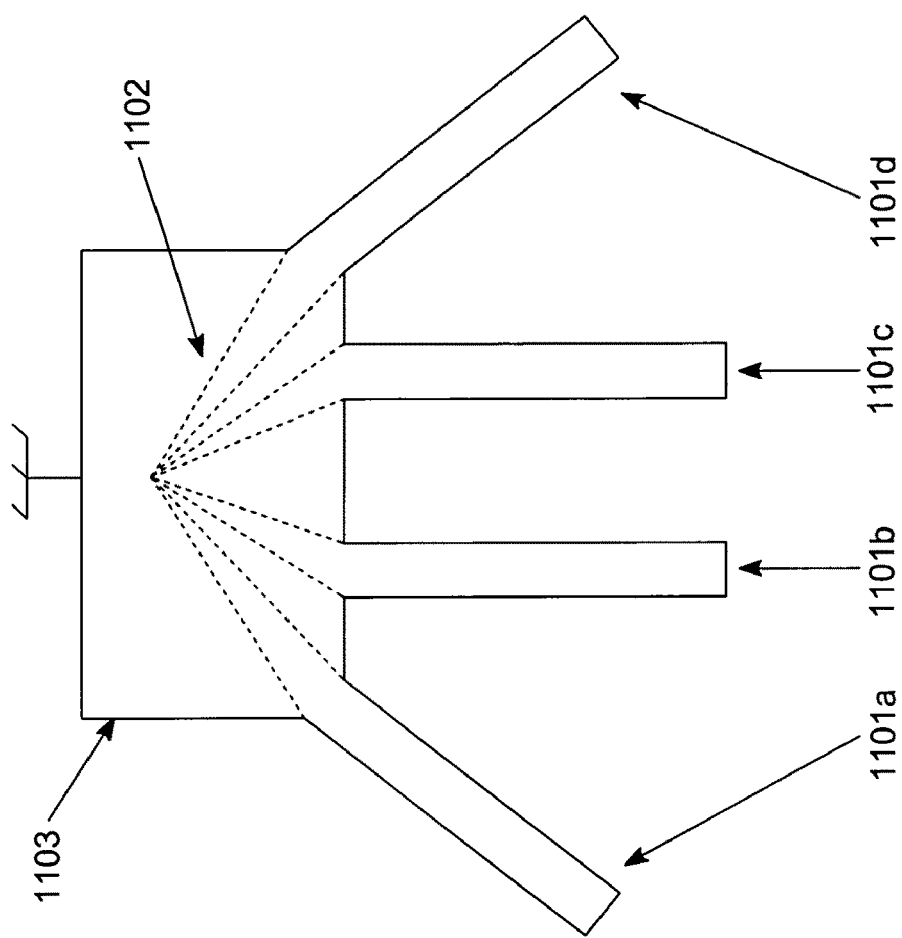

MEMS ACTUATOR DEVICE WITH INTEGRATED TEMPERATURE SENSORS

FIELD OF THE INVENTION

The present invention is in general related to nanopositioning and to CMOS-MEMS (Complementary Metal Oxide Semiconductor—Micro-electromechanical System) devices capable of positioning a payload with sub-nanometer resolution in a closed-loop fashion. More particularly, it relates to thermal bimorph actuators having integrated temperature sensors for mitigating thermal coupling effects.

BACKGROUND OF THE INVENTION

The fabrication of features with dimensions of several hundreds of atoms has become quite routine in semiconductor manufacturing. However, conventional fabrication, inspection, and metrology tools are being stretched to their limits.

Atomically precise metrology tool requirements include enhanced resolution, stability and throughput as well as scaled-up array operation and ultra-high vacuum (UHV) compatibility. Another requirement is nano-scale closed-loop position control in all three degrees of freedom.

Scanning probe microscopy covers several related technologies for imaging and measuring surfaces on a fine scale, down to atomic resolution. A scanning probe microscope (SPM) scans an extremely sharp tip of a probe across an object surface while measuring the probe tip-sample interaction via a tunnelling current, atomic force, capacitance, workfunction, near field optical detection, or some other means. The imaging signal associated with the scanning probe tip-sample interaction is provided to an imaging system for suitable processing and image rendering.

Conventional SPMs use piezoelectric materials to provide the necessary resolution for scanning. Piezoelectric materials change shape when an electric voltage is applied across them. However, it takes a relatively high voltage—about 100 volts—to make a piezoelectric actuator change shape. This makes for expensive control electronics. In addition, these materials exhibit creep, which compromises the ability to position the probe tip deterministically and with a high degree of stability. With conventional SPMs, the mechanical path between the tip and the sample is sensitive to small temperature variations causing relatively large drift, and is also inherently less mechanically stable than for a miniaturized device. Moreover, it is difficult to implement array architectures using a conventional SPMs.

Fine-scale MEMS (micro-electromechanical systems) positioners provide an alternative to piezoelectric actuators. MEMS-based metrology devices are generally less expensive to manufacture. The driving electronics can be less expensive, since less voltage is required for some types of actuation. However, many MEMS positioners have no electrical signal routing, no position feedback, no integration of sensors inside the actuator, and limited resolution.

Examples of static position sensing in MEMS include:
1) capacitive sensing (charge sensing), where the voltage signal is low and susceptible to noise;
2) piezoresistive sensing, which requires careful thermal balancing and has limitations on ultimate resolution; and
3) optical sensing, which requires tedious alignment and is not amenable to array architectures.

Dynamic position sensing can make use of lock-in amplifier techniques.

A SPM implemented in a CMOS-MEMS process is described in "A CMOS-MEMS Scanning Probe Microscope with Integrated Position Sensors", Niladri Sarkar et al. The CMOS-MEMS SPM, with actuators arranged around a central stage that houses a cantilevered probe, allows the integration of all the critical actuation, sensing, and electronic components of an SPM on a wafer that can be batch fabricated in a conventional foundry thereby reducing the size and cost of the SPM while providing the required sensitivity and resolution. However, a main source of disturbance in the position control of the CMOS-MEMS SPM is unwanted parasitic thermal coupling between the actuators and the wafer substrate.

Therefore, there is a need for a MEMS nanopositioner design that provides high resolution and sensitivity while mitigating the problems of thermal coupling.

SUMMARY OF THE INVENTION

In accordance with one aspect of the present invention, there is provided an electro-thermal actuator which includes:
   a unit cell comprising at least one thermal bimorph, the thermal bimorph comprising at least two materials of different thermal expansion coefficient bonded together, the unit cell having a first end and a second end; and
   at least one temperature sensor located on the at least one thermal bimorph for measuring a temperature of the at least one thermal bimorph and determining a position of the unit cell.

In accordance with another aspect of the present invention, there is provided a one-dimensional positioner for positioning a stage. The one-dimensional positioner includes:
   an electrothermal actuator for translating the stage essentially in one direction, the electrothermal actuator comprising:
      a unit cell comprising at least one thermal bimorph, the thermal bimorph comprising at least two materials of different thermal expansion coefficient bonded together, the unit cell having a first end and a second end; and
      at least one temperature sensor located on the at least one thermal bimorph for measuring a temperature of the at least one thermal bimorph and determining a position of the unit cell; and
   wherein the electrothermal actuator is mechanically coupled to the stage.

In accordance with another aspect, there is provided a two-dimensional positioner for positioning a stage. The two-dimensional positioner includes:
   a pair of electrothermal actuators, each electrothermal actuator comprising:
      a unit cell comprising at least one thermal bimorph, the thermal bimorph comprising at least two materials of different thermal expansion coefficient bonded together, the unit cell having a first end and a second end; and
      at least one temperature sensor located on the at least one thermal bimorph for measuring a temperature of the at least one thermal bimorph and determining a position of the unit cell; and
   the pair of electrothermal actuators arranged orthogonally such that a first one of the pair of electrothermal actuators translates the stage in a first direction and a second one of the pair of electrothermal actuators translates the stage in a second direction orthogonal to the first direction.

In accordance with yet another aspect of the invention, there is provided a three-dimensional positioner for positioning a stage. The three-dimensional positioner includes:

three electrothermal actuators, each electrothermal actuator including:
  a unit cell comprising at least one thermal bimorph, the thermal bimorph comprising at least two materials of different thermal expansion coefficient bonded together, the unit cell having a first end and a second end; and
  at least one temperature sensor located on the at least one thermal bimorph for measuring a temperature of the at least one thermal bimorph and determining a position of the unit cell; and
the electrothermal actuators arranged mutually orthogonally such that a first one of the electrothermal actuators translates the stage in a first direction, a second one of the electrothermal actuators translates the stage in a second direction orthogonal to the first direction, and a third one of the electothermal actuators translates the stage in a third direction orthogonal to the first direction and the second direction.

In accordance with still another aspect of the invention, there is provided an active yoke to couple multiple actuators together while increasing force and stiffness and retaining optimal stroke. The active yoke is a bimorph of a shorter length and narrower cross section that provides equal and opposite tip rotation in order to cancel the angular deflection of the actuator tip. A plate can thus be used to couple all the actuators together without loss of deflection. Without such a yoke, coupling the actuators to a plate would impose a zero-moment constraint at the tip of the actuator beams, resulting in zero deflection. The conventional method to mitigate this issue is to employ a pair of symmetrically opposed bimorphs to cancel the tip rotation; however, the proposed method has been shown to produce ~75% more deflection than the state-of-the-art.

Still another aspect of the invention provides a pair of thermally balanced piezoresistive sensors that can be used to measure externally applied forces, or augment the position resolution of the actuator. The balanced pair of piezoresistors is arranged differentially with respect to strain, such that upon the actuator's lateral deflection, one experiences compressive strain while the other experiences tensile strain. Similar arrangements can be used for out-of-plane measurements.

In accordance with another embodiment, the piezoresistors may be arranged in an opposed pair of cantilevers such that both piezoresistors are at the same temperature but only one interacts with the sample.

In accordance with yet another aspect of the invention, there is provided a method of singulating the devices from a single wafer, obviating the need for a backside deep reactive ion etch (DRIE) step. The convention DRIE method requires a lithography and patterning step that is both time consuming and expensive. The proposed method employs a conventional wafer saw to dice grooves in the backside of the wafer, such that upon release of the device layer, the chips are singulated once the top-side etch reaches the backside groove, In accordance with yet another aspect of the invention, there is provided a method of obtaining multiple sharp tips in a common work area with spacings that are not achievable using conventional lithography. The method employs a design pattern in which all positioners are coupled to a plate at their distal ends. The focused ion beam (FIB) instrument is then used to mill sub-micron grooves that define various arrangements, geometry and spacing of the tips as specified by the operator.

Each actuator may act as a 1-D positioner.

In accordance with another aspect of the invention there is provided a 2-D system based on orthogonally arranged thermal bimorph actuators.

In accordance with another aspect of the invention there is provided a 2-D system based on a flexured arrangement of thermal bimorph actuators.

In accordance with another aspect of the invention there is provided a 3-D system based on a combination of flexured arrangements and orthogonal arrangements of thermal bimorph actuators.

It will be appreciated by the reader that the method described herein can also be used with chevron-type actuators that consist of a single material, among other actuators. In fact, most electro-thermal actuators can make use of these techniques.

Other features and advantages of the present invention will be better understood upon reading of preferred embodiments thereof with reference to the appended drawings.

BRIEF DESCRIPTION OF THE DRAWINGS

For a better understanding of the invention and to show how the same may be carried into effect, reference is now made by way of example to the accompanying drawings in which:

FIG. 11 is a schematic representation of a method for create tips using a focused ion beam (FIB) instrument.

DESCRIPTION OF THE INVENTION

The present invention is directed to a system and method which is operable to manipulate a sharp probe with sub-nanometer position resolution in x, y and z coordinates in a closed-loop fashion.

Actuation is achieved using the thermal bimorph effect. This effect relies on a mismatch in thermal expansion coefficients between two materials in a monolithic beam structure, in order to achieve a deflection as a function of temperature. Lateral actuation is achieved by offsetting the internal metal layers in the beam, thus resulting in bimorph layers encased in the monolithic beam.

Reducing the width of the beam increases the deflection. However, a single thin beam does not provide high forces and large out-of-plane stiffness (required in AFM, STM, probing applications). The output force and out-of-plane stiffness can be increased by coupling several of these bimorphs together.

This is made possible through the use of symmetrically opposed bimorphs in order to cancel the rotation at the tips.

Figure 1:
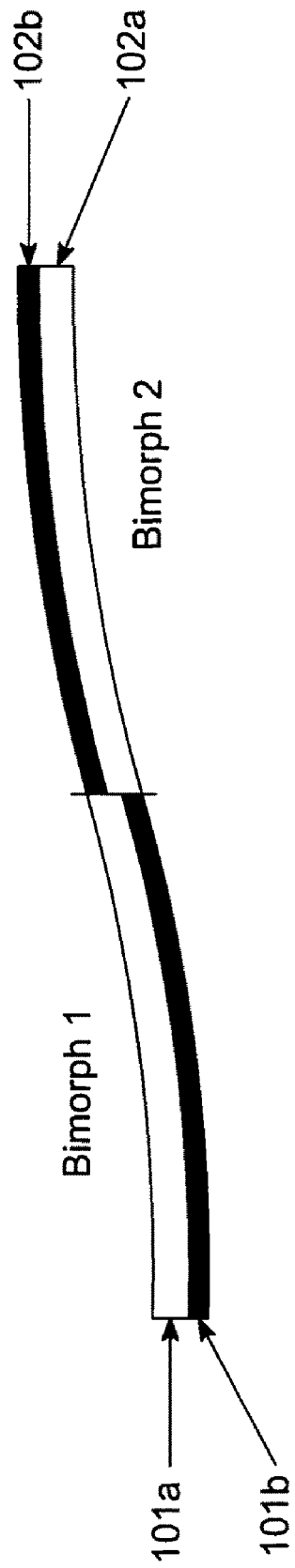
FIG. 1 is a representation of a unit cell consisting of a pair of symmetrically opposed bimorphs.

Referring now to FIG. 1, there is shown a unit cell consisting of a pair of symmetrically opposed bimorphs. In their simplest expression, bimorphs consist of a pair of materials which have different coefficients of thermal expansion. In FIG. 1, there are show two bimorphs 1, 2 which are symmetrically opposed (i.e. materials on bimorph is on the bottom, whereas on bimorph, it is on top). Bimorph 1 consists of material 101a and 101b, whereas bimorph 2 consists of materials 102b and 102a.

Figure 2:
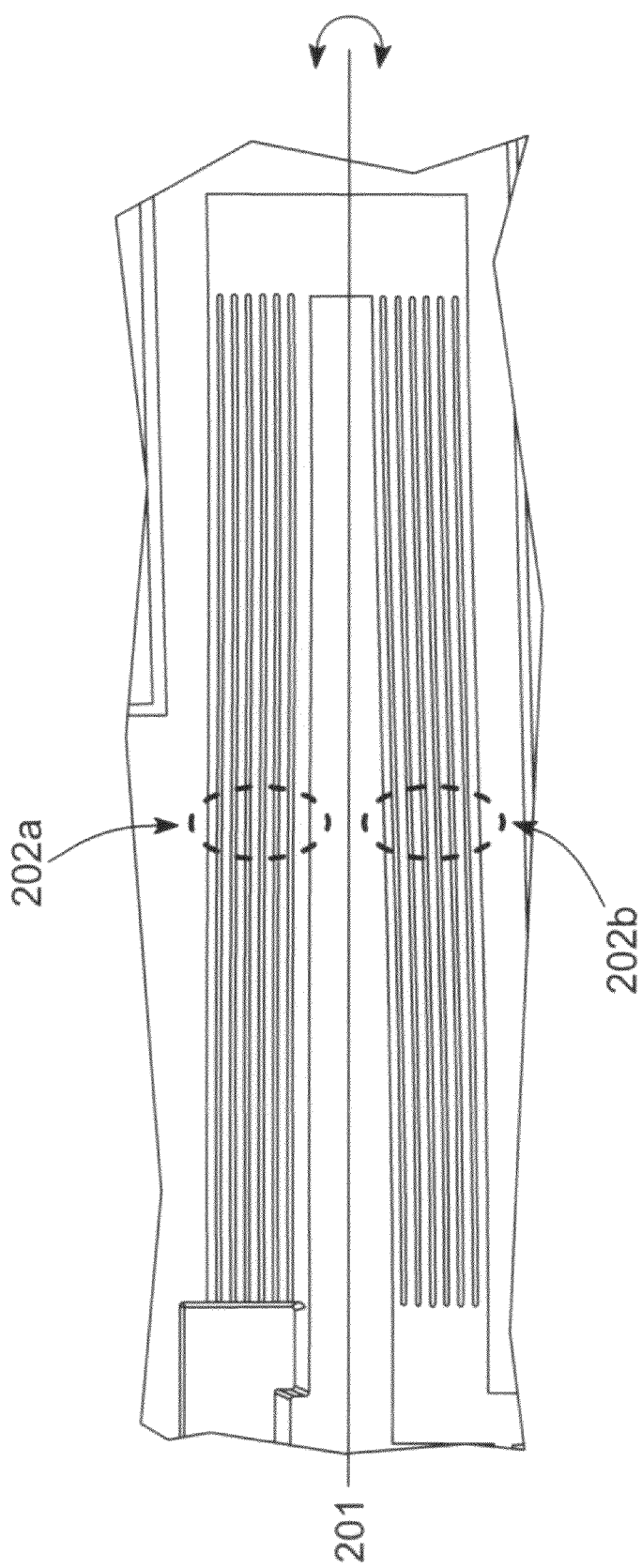
FIG. 2 is a representation of a set of unit cells (coupled in parallel) mirrored about the axis of symmetry in order to eliminate parasitic out-of-plane motion.

Referring now to FIG. 2, there is shown several unit cells coupled in parallel 202a, 202b and mirrored about the axis of symmetry 201 in order to eliminate parasitic out-of-plane motion.

The state of the art for a single actuator is represented in the figure above. The shortcoming of this approach is that displacement is reduced by a factor of two in order to cancel out the rotation at the tip.

Figure 3:
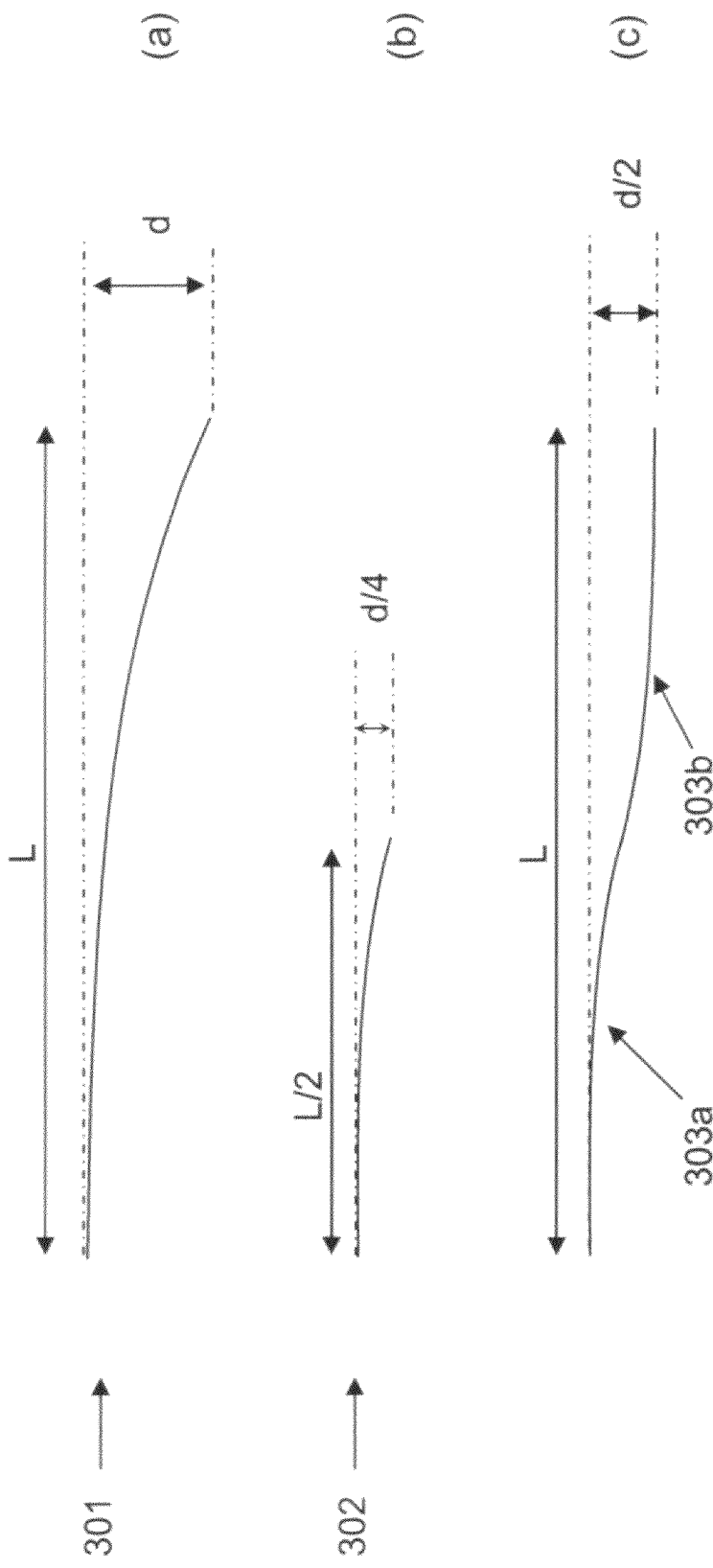
FIG. 3 is a graph showing the comparison of the deflection obtained with various arrangements of bimorphs.

In FIG. 3(a) there is shown a bimorph of length L that achieves a deflection d upon heating. The second case shown in FIG. 3(b) is a beam of length L/2 that achieves a displacement of d/4, due to the (d α L2) relationship. The third case shown in FIG. 3(c) illustrates the unit cell consisting of two opposed bimorphs having a length L that achieves d/2 displacement.

An alternate approach to coupling several bimorphs together is to use a yoke (mechanical flexure) to couple the bimorphs together.

Figure 4:
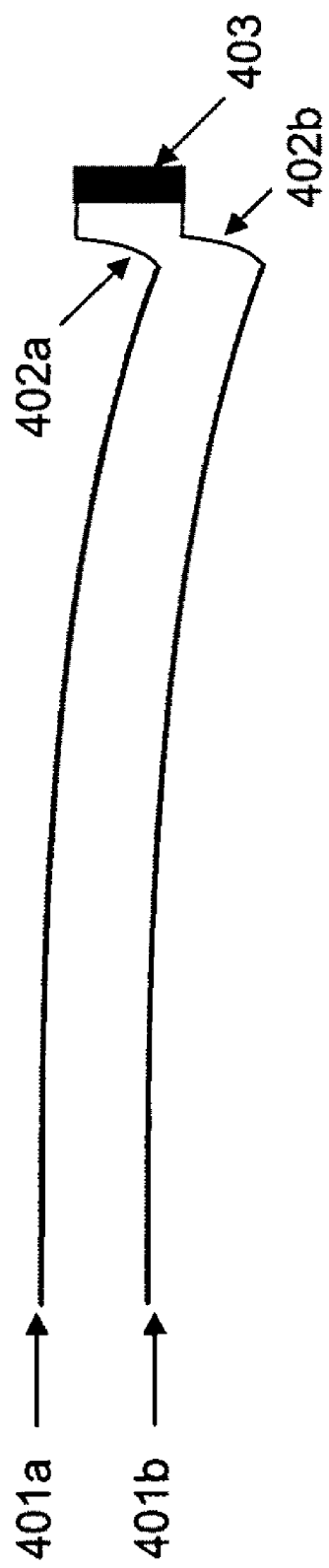
FIG. 4 is a representation of 2 bimorphs coupled together to a plate using conventional yokes.
Figure 5:
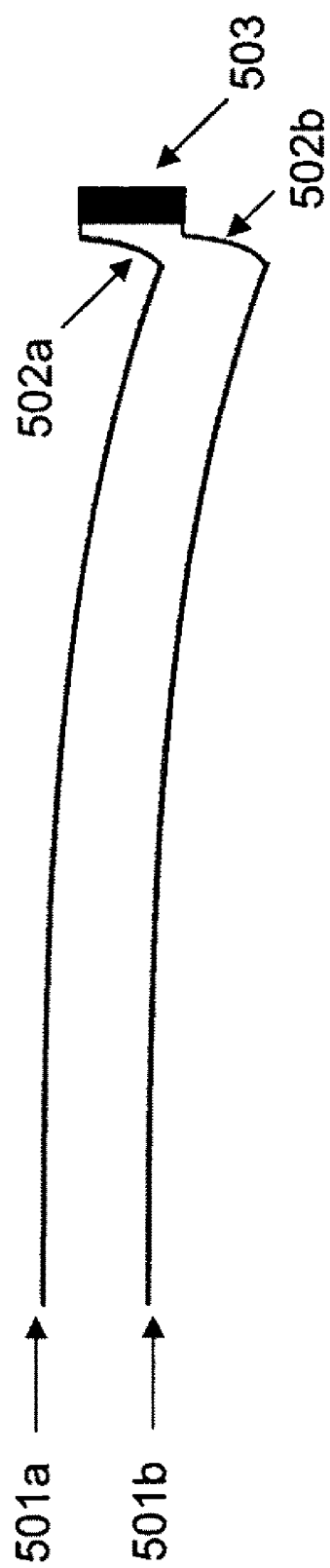
FIG. 5 is a representation of 2 bimorphs coupled together to a plate using active yokes.

More specifically, in FIG. 2, the beams (there are 7 of them) are arranged in the symmetrically opposed fashion described in 303a and 303b. This arrangement enables direct coupling to a plate, since there is no rotation at the tip of a single beam when it is free at the distal end. This arrangement, however, only achieves ½ of the deflection of the bimorph beam in 301. In FIG. 4, instead of using the bimorph arrangement in 303a/b, we use a single bimorph beam as shown in figure 301. Two of these beams are coupled to a plate using "yoke" flexures that are not bimorphs. The force required to bend this passive yoke flexures detracts from the overall deflection of the bimorph beams. In FIG. 5, the yokes are mini-bimorphs that oppose the tip rotation of the actuator bimorphs, so that they can be coupled to a plate without loss of deflection.

The yoke approach results in less overall displacement than the opposed bimorphs approach in FIG. 3c. This is because the strain energy required to bend the yokes reduces the amount of mechanical work that the actuators can perform. One aspect of the present invention improves the overall actuation achievable by coupled actuators with the introduction of an "active yoke" as shown in FIG. 5.

The active yoke according to the present invention is a short bimorph 502a, 502b that is coupled to plate 503 that bends in order to counter the moment at the tip of the actuator bimorph—this reduces the amount of work that is lost to bending energy. The overall displacement that is achieved by this configuration, when the yoke is properly designed, can be increased by >60%.

Passive yokes (FIG. 4) have been used in the past, but active yokes (FIG. 5) are novel. The structural difference between FIGS. 4 and 5 is the addition of the bimorph in the yokes of FIG. 5, which turns them into bimorphs. The functional difference between the figures is that the yokes in FIG. 5 deflect upon heating, and they are designed to exactly cancel out the angular rotation at the tip of the actuator bimorphs, resulting in the zero-moment condition referred to.

Figure 6:
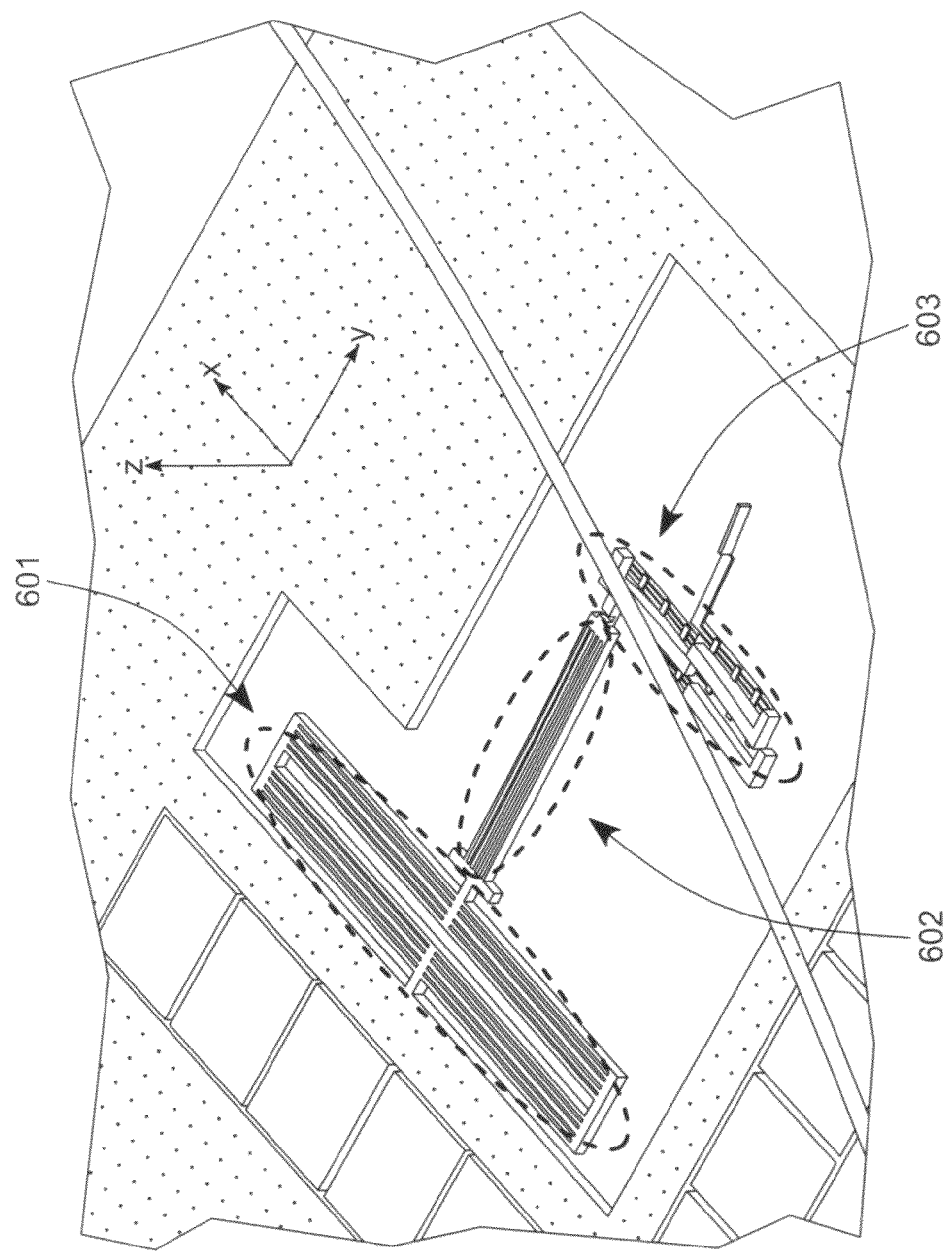
FIG. 6 is a schematic representation of an XYZ positioner that suffers from parasitic thermal coupling.

The main source of disturbance in the position control system for the nanopositioner is thermal coupling. This is shown in FIG. 6 (ref: US patent application publication no. 2007/0278896) in which all three axes are mechanically, electrically, and thermally coupled.

In this Figure, when the z-actuator 603 is powered and reaches a steady-state temperature, heat flows through the x-actuator 602 and the y-actuator 604 to the substrate (at ambient temperature) to maintain thermal equilibrium.

The parasitic heat flow through the x and y actuators results in an undesired deflection of the actuators. This is suppressed using distributed temperature sensors that measure the temperature of the electro-thermal actuators at various locations in order to calculate their position. Polysilicon resistors that are used in this process have a temperature coefficient of resistivity that is sufficiently high for accurate thermal measurements. The heat flowing into/out of the positioners from mechanically coupled actuators or into a substrate (at ambient temperature) can be deduced from a pair of temperature measurements on either end of a known thermal resistance path. A control system with temperature inputs and position outputs can be used to control position with sub-nanometer precision.

Another drawback of thermal coupling is that the devices have a limited range of motion corresponding to their rest position while neighboring actuators are at max power (significantly offset from the power-off rest position).

Figure 7:
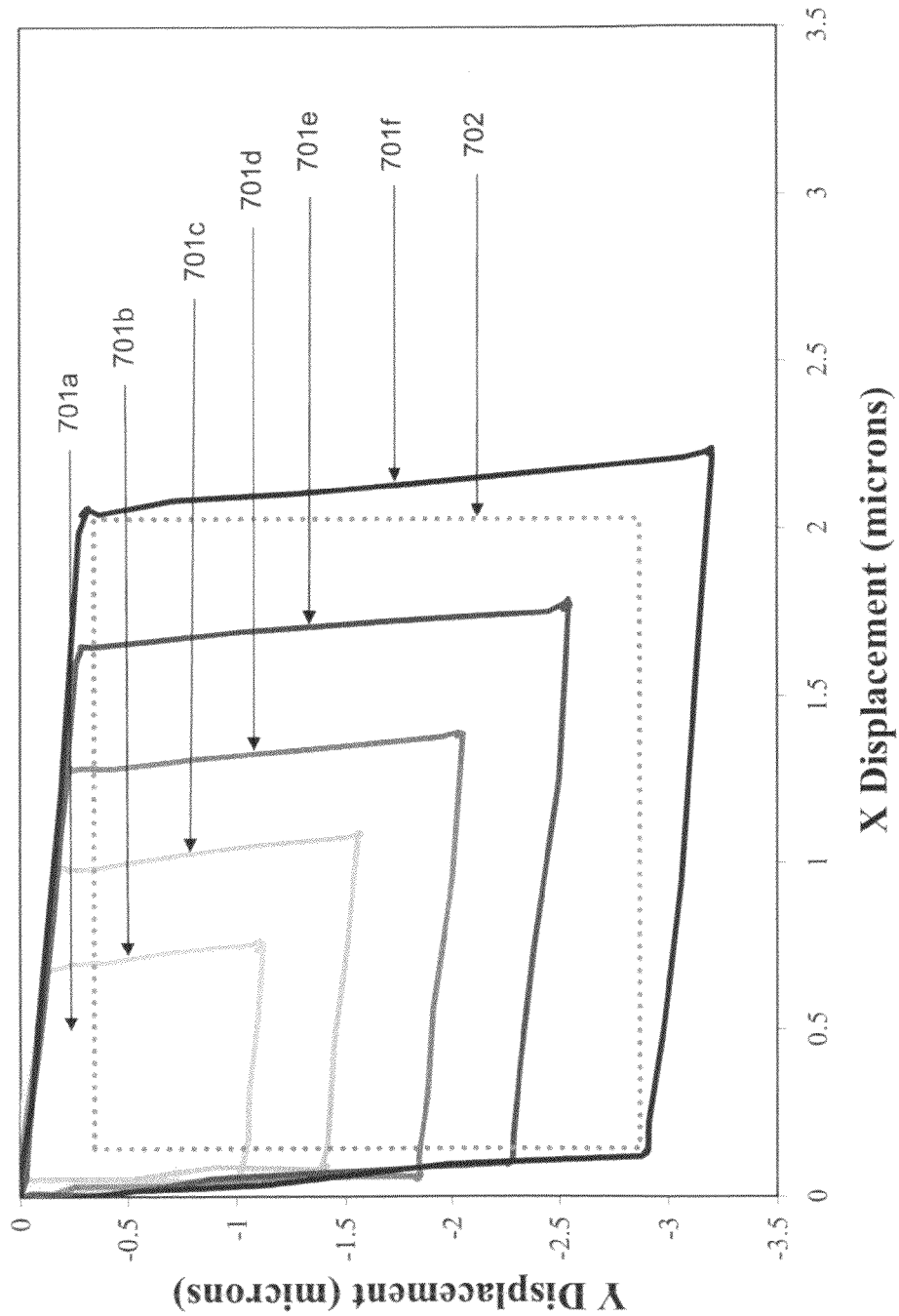
FIG. 7 is a graph showing the data taken on an XY positioner operating under open-loop conditions.

FIG. 7 shows the data taken on an XY positioner operating under open-loop conditions.

The driving signals are intended to move the payload in a rectilinear fashion; however due to thermal coupling effects, parasitic motion in the orthogonal axis accompanies the desired motion. Concentric paths 701a-f represent incrementally increasing driving voltages. Bounding box 702 represents the region of operation in which closed-loop control can eliminate coupling effects.

In order to mitigate the effects of thermal coupling and increase the useful range of motion of these devices, thermal shunt paths can be used to redirect heat to the substrate instead of to other actuators. In addition, temperature sensors can be placed at either end of these thermal shunt paths in order to quantify the heat flow and use it as an input to the control system.

Figure 8:
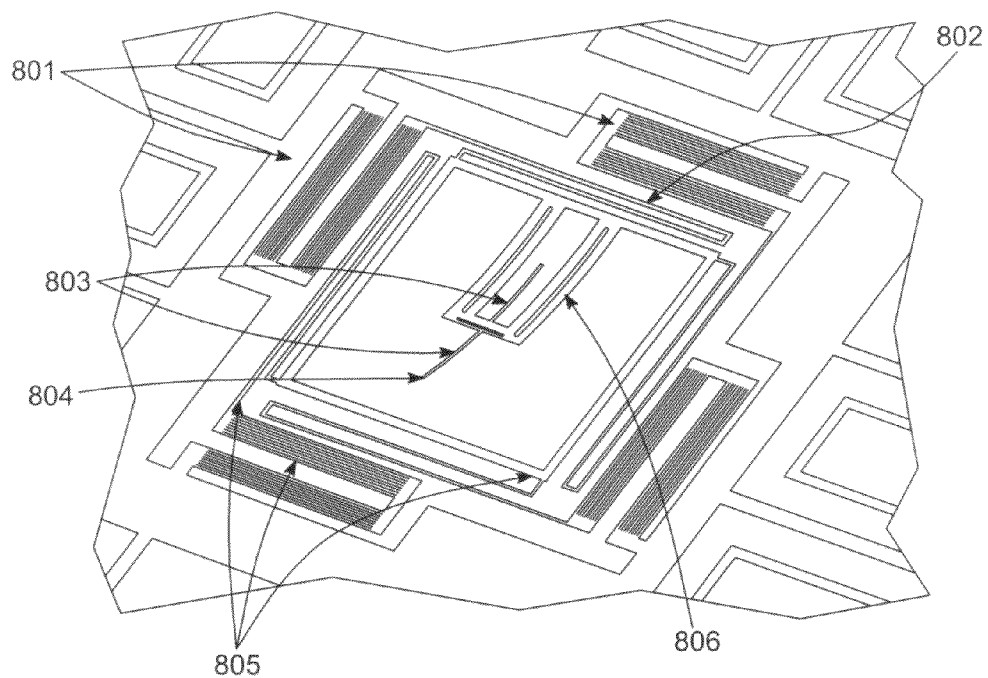
FIG. 8 is a schematic representation of a CMOS-MEMS scanning probe microscope with integrated actuation and sensing.

FIG. 8 shows a CMOS-MEMS scanning probe microscope with integrated actuation and sensing. Lateral actuators (801) are arranged orthogonally to balance torques on the center stage that houses the z-actuator (804) and balanced cantilevers (803). Flexures (802) are used to couple the lateral actuators to the central stage. Temperature sensors (805) are placed strategically to measure the direction of heat flow and average temperature of the actuators for an accurate estimate of position.

Decoupled and orthogonal motion in the 3 axes is desirable. An additional method of reducing the thermal coupling is to use high thermal resistance materials to mechanically couple parts of the device together, while isolating them thermally.

To measure external forces exerted onto the positioner, a thermally balanced pair of piezoresistors can be used to compare desired deflection to actual deflection. In this implementation, a lookup table may be used for comparison of expected vs. measured values.

Figure 9:
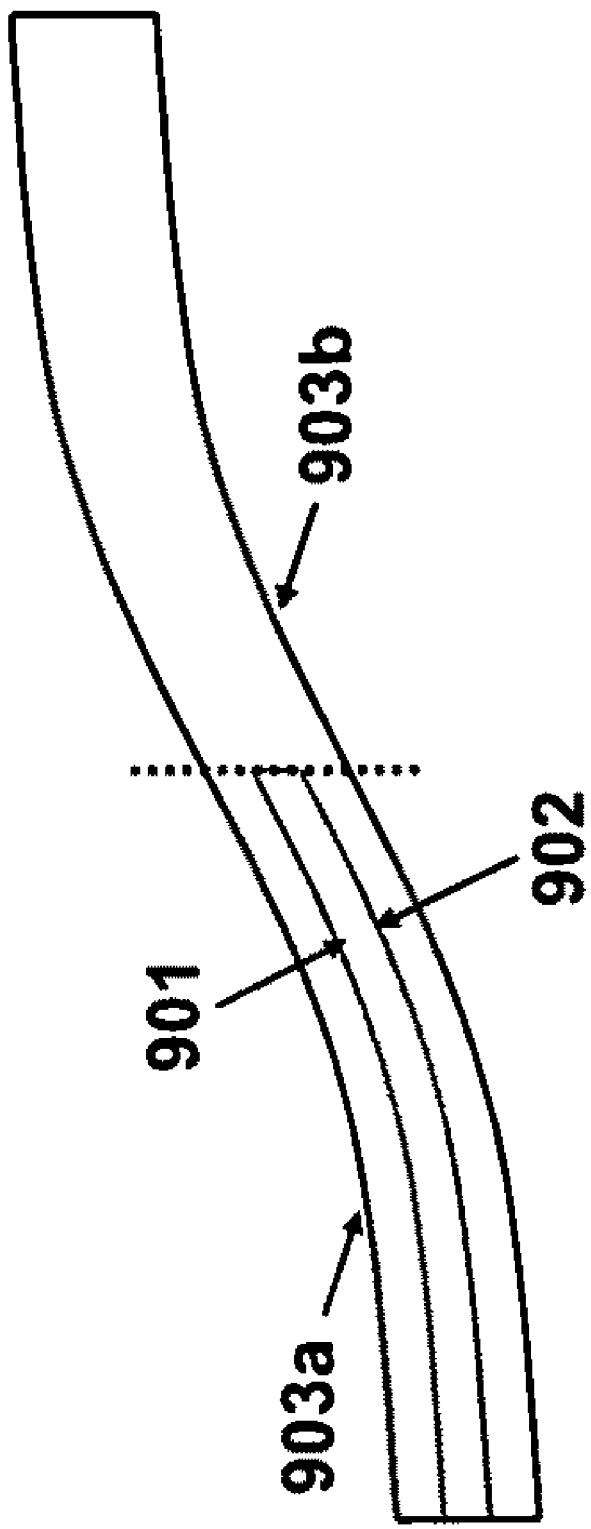
FIG. 9 is a schematic representation of a differential arrangement of piezoresistors in a pair of symmetrically opposed bimorphs.

This is illustrated in FIG. 9, which Illustrates a differential arrangement of piezoresistors (901, 902) in a pair of symmetrically opposed bimorphs (903a, 903b). One piezoresistor is in compressive strain (901) while the other is in tensile strain (902), and both are at the same temperature.

To operate these 3 DOF positioners over a sample we can remove a portion of the substrate underneath the distal end of the devices using a back-side etch process This process is difficult to implement on a wafer scale due to non-uniformities in the etch rate. It is also costly and time consuming since it requires a patterning step followed by an extended period of time in a Deep Reactive Ion Etch instrument. Thus, another aspect of the invention is to use a dicing saw to cut grooves in the backside of the wafer and then perform a standard device release process from the top side.

Figure 10:
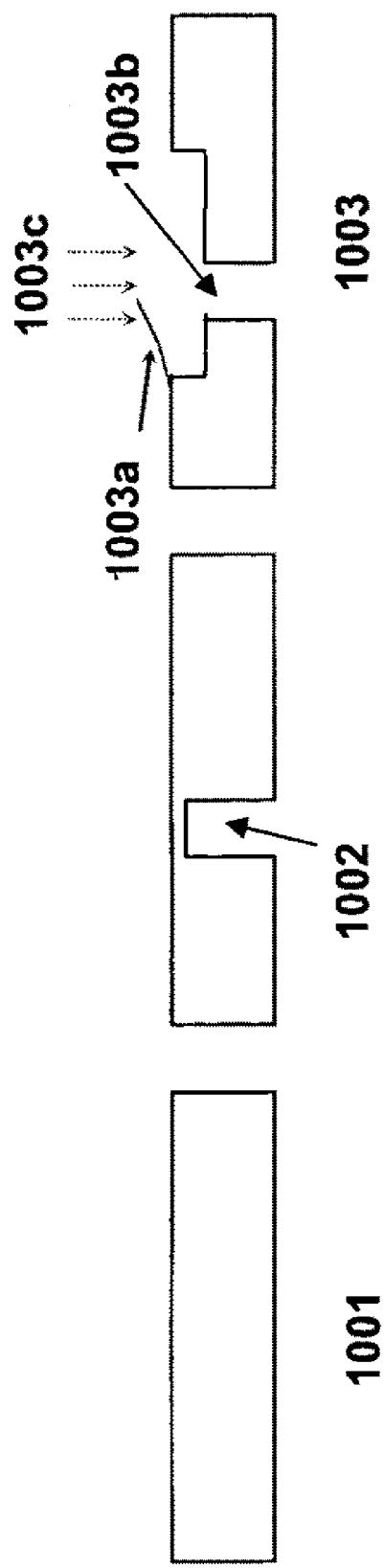
FIG. 10 is a schematic representation of the method to singulate scanning probe microscope devices fabricated on a single starting wafer.

In FIG. 10, Illustration of method to singulate scanning probe microscope devices fabricated on a single starting wafer (1001). A backside groove (1002) is created using a dicing saw. In the final step (1003), reactive ions (1003c) are used to etch the device from the top side, yielding released cantilevers (1003a) and defining a new die edge (1003b).

Referring now to FIG. 11, there is schematically illustrated a method for creating type using a focussed Ion Beam instrument. Beams from the positioner 1101a-d terminate on a plate 103. The milling lines 1102 generated by the FIB are used to define tip geometry.

Of course, numerous modifications could be made to the embodiment described above without departing from the scope of the present invention.

The invention claimed is:

1. An electro-thermal actuator comprising:
    a plurality of unit cells coupled in parallel, each of the plurality of unit cells comprising a first thermal bimorph, the first thermal bimorph comprising at least two materials having different thermal expansion coefficients bonded together, each of the plurality of unit cells having a first end and second end, wherein the first ends of the plurality of unit cells collectively define a plane, and wherein the second ends of the plurality of unit cells are physically connected at an end point, the plurality of unit cells being operative to move the end point along a first direction that is substantially orthogonal to the plane;
    a heater that is operative to provide thermal energy to at least one of the plurality of unit cells;
    a first piezoresistor and a second piezoresistor, the first and second piezoresistors being arranged on the plurality of unit cells such that they are at the substantially the same temperature, wherein each of the first and second piezoresistor cantilevers from the end point such that the free end of the first piezoresistor projects further away from the plane than the free end of the second piezoresistor when the electro-thermal actuator is actuated; and
    a first temperature sensor that is operative to measure a first temperature at a first location, wherein the first temperature is based on parasitic heat flow through a first unit cell of the plurality of unit cells, and wherein the position of the electro-thermal actuator is based on the temperature at the first location.

2. An electro-thermal actuator according to claim 1, wherein at least one of the plurality of unit cells further comprises a second thermal bimorph, the first and second thermal bimorphs being arranged such that they are substantially symmetrically opposed and bonded end-to-end.

3. An electro-thermal actuator according to claim 1, wherein the first temperature sensor comprises a resistor.

4. An electro-thermal actuator according to claim 1, further comprising a second temperature sensor, wherein the first temperature sensor is located proximate the first end of the first unit cell and the second temperature sensor is located proximate the second end of the first unit cell.

5. An electro-thermal actuator according to claim 1, wherein the first temperature sensor is located intermediate the first end and the second end of the first unit cell.

6. An electro-thermal actuator according to claim 1, wherein the first piezoresistor and second piezoresistor are arranged differentially such that one of the first piezoresistor and second piezoresistor is in compression and the other one of the first piezoresistor and second piezoresistor is in tension.

7. An electro-thermal actuator according to claim 1, wherein one of the materials is a metal.

8. An electro-thermal actuator according to claim 1, wherein one of the materials is silicon dioxide.

9. A positioner, the positioner comprising:
    (1) a stage, the stage defining a first plane;
    (2) a first electro-thermal actuator having a first end coupled with the stage and a second end that is movable along a first direction that is substantially orthogonal to the first plane, the first electro-thermal actuator being operative to move the second end along the first direction;
    (3) a second electro-thermal actuator operative to move the stage along a second direction within the first plane, the second electro-thermal actuator comprising:
        (a) a first unit cell comprising at least one thermal bimorph, the thermal bimorph comprising at least two materials of different thermal expansion coefficient bonded together; and
        (b) a first heater that is operative to control the temperature of the first unit cell based on a first drive signal;
    (4) a first flexure, the first flexure being coupled between the stage and the second electro-thermal actuator; and
    (5) a first temperature sensor that is operative to provide a first output signal based on a first temperature at a first location on the first flexure, wherein the first temperature is based on parasitic heat flow between the stage and the second electro-thermal actuator, and wherein the first drive signal is based on the first output signal.

10. The positioner of claim 9 further comprising:
    (6) a third electro-thermal actuator operative to move the stage along a third direction within the first plane, the third direction being non-co-linear with the second direction, the third electro-thermal actuator comprising:
        (a) a second unit cell comprising at least one thermal bimorph, the thermal bimorph comprising at least two materials of different thermal expansion coefficient bonded together; and
        (b) a second heater that is operative to control the temperature of the second unit cell based on a second drive signal;
    (7) a second flexure, the second flexure being coupled between the stage and the third electro-thermal actuator; and
    (8) a second temperature sensor that is operative to provide a second output signal based on a second temperature at a second location on the second flexure, wherein the second temperature is based on parasitic heat flow between the stage and the third electro-thermal actuator, and wherein the second drive signal is based on the second output signal.

11. The positioner of claim 9 further comprising a first piezoresistor and a second piezoresistor, the first and second piezoresistors being arranged such that they are at the substantially the same temperature, wherein each of the first and second piezoresistor cantilevers from the second end such that the free end of the first piezoresistor projects further away from the first plane than the free end of the second piezoresistor when the first electro-thermal actuator is actuated.

12. An electro-thermal actuator comprising:
    a plurality of unit cells coupled in parallel, each of the plurality of unit cells comprising a first thermal bimorph, the first thermal bimorph comprising at least two materials having different thermal expansion coefficients bonded together;

a heater that is operative to provide thermal energy to the unit cell;

an active yoke operative for coupling the plurality of unit cells in parallel, the active yoke comprising a thermal bimorph of a shorter length than the first thermal bimorph of each of the plurality of unit cells, the active yoke connecting a first end of one of the plurality of unit cells to the first end of an adjacent one of the plurality of unit cells; and a first temperature sensor that is operative to measure a first temperature at a first location, wherein the first temperature is based on parasitic heat flow through a first unit cell of the plurality of unit cells, and wherein the position of the electro-thermal actuator is based on the temperature at the first location.

13. An electro-thermal actuator according to claim 12, wherein at least one of the plurality of unit cells further comprises a second thermal bimorph, the first and second thermal bimorphs being arranged such that they are substantially symmetrically opposed and bonded end-to-end.

14. An electro-thermal actuator according to claim 12, wherein the first temperature sensor comprises a resistor.

15. An electro-thermal actuator according to claim 12, further comprising a second temperature sensor, wherein the first temperature sensor is located proximate the first end of the first unit cell and the second temperature sensor is located proximate the second end of the first unit cell.

16. An electro-thermal actuator according to claim 12, wherein the first temperature sensor is located intermediate the first end and the second end of the first unit cell.

17. An electro-thermal actuator according to claim 12, wherein the first piezoresistor and second piezoresistor are arranged differentially such that one of the first piezoresistor and second piezoresistor is in compression and the other one of the first piezoresistor and second piezoresistor is in tension.

18. An electro-thermal actuator according to claim 12, wherein one of the materials is a metal.

19. An electro-thermal actuator according to claim 12, wherein one of the materials is silicon dioxide.

\* \* \* \* \*